United States Patent [19]
Gifford et al.

[11] Patent Number: 5,301,314
[45] Date of Patent: Apr. 5, 1994

[54] COMPUTER-AIDED CUSTOMER SUPPORT SYSTEM WITH BUBBLE-UP

[75] Inventors: Rick L. Gifford; Elizabeth Anderson, both of San Jose; Louise Kirkbride, Monte Sereno; John T. Evans, Jr., Mountain View, all of Calif.

[73] Assignee: Answer Computer, Inc., Sunnyvale, Calif.

[21] Appl. No.: 740,578

[22] Filed: Aug. 5, 1991

[51] Int. Cl.$^5$ .................. G06F 12/00; G06F 12/08
[52] U.S. Cl. .................. 395/600; 364/DIG. 1; 364/955.3; 364/960.5; 364/962.3; 364/961.2
[58] Field of Search .............. 395/600; 364/DIG. 2, 364/955.3, 960.5, 962.3, 961.2

[56] References Cited

U.S. PATENT DOCUMENTS

4,078,260  3/1978  Chen et al. ................ 364/900
5,072,383  12/1991  Brimm et al. ............ 364/413.02

Primary Examiner—Gareth D. Shaw
Assistant Examiner—A. Katbab
Attorney, Agent, or Firm—Fenwick & West

[57] ABSTRACT

A computer-aided customer support system is described for rapidly retrieving stored documents useful in answering customer inquiries. A hierarchical index tree is used in which an indexing document is referenced at each level as the search proceeds down through the various tiers. Once the targeted document is retrieved and reviewed, the user is interrogated by the system as to the usefulness of the document in solving the customer's inquiry. Based on the response to this interrogation, the usefulness priority and location of this document within the tree structure are reevaluated.

4 Claims, 7 Drawing Sheets

| Help | Solve Problem | Search | Index |
|---|---|---|---|
| Go Back | Mail | Submit Problem | Direct Access |
| Top | Hard Copy | View Incident | Client Files |

Welcome to Apriori!

Level: /Supporting Clients

| General | Support Engineer | Data Owner |
|---|---|---|

The most useful Documents related to this Index; select any item for details.

?-20-20, C, Tracking a Submitted Problem Report.
?-20-7, C, Viewing a Document's Symptoms/Indexes/History
?-20-9, C, Finding a Document Through Diagnosis
?-20-10, C, Finding a Document Using the Index List.
?-20-16, C, Finding Related Documents or Indexes.
?-20-17, C, Creating a Problem Report.
?-15-1, C, A Support Engineer's role in a support center using Apriori.
?-15-2, C, A List of Support Engineer capabilities.
?-15-3, C, A Data Owners role in a support center using Apriori.
?-15-4, C, Listing of Data Owner tasks.
?-20-1, C, Logging in As Yourself.
?-20-11, C, Finding a Document Using Symptoms

COMPUTER-AIDED CUSTOMER SUPPORT SYSTEM WITH BUBBLE-UP

BACKGROUND OF THE INVENTION

The present invention relates to a heuristic learning application program.

Expert systems are known in the art. They involve a set of algorithms that are driven by rules provided by human experts and stored in a knowledge base. Typically, knowledge bases are stored on computers so that the rules may be rapidly applied to a given problem. However, when the problem being dealt with is a rapidly evolving subject matter that has a complexity that is beyond the understanding of a single person then expert systems have typically failed because it takes too long to build the knowledge tree necessary to solve a problem. Further, by the time a knowledge table is built, the need for which the expert system is originally consulted has often either changed or disappeared. Further, it is possible that the original need has been replaced by a new and different need requiring a different set of knowledge rules.

Accordingly, it is desirable to provide a system that provides rapid learning without the necessity of building a complex knowledge base prior to first use of the system to solve the problem or need.

Expert systems are quite expensive to purchase, setup and maintain. Moreover, expert systems require that expert programers be retained who are knowledgeable in programming using artificial intelligence (AI).

Accordingly, it is desirable to provide a heuristic application program that is relatively inexpensive to purchase, setup and run on low cost computer devices. Further, it is desirable that the system be maintained by experts in system administration as opposed to experts in programming using AI.

SUMMARY OF THE INVENTION

Figure 1:
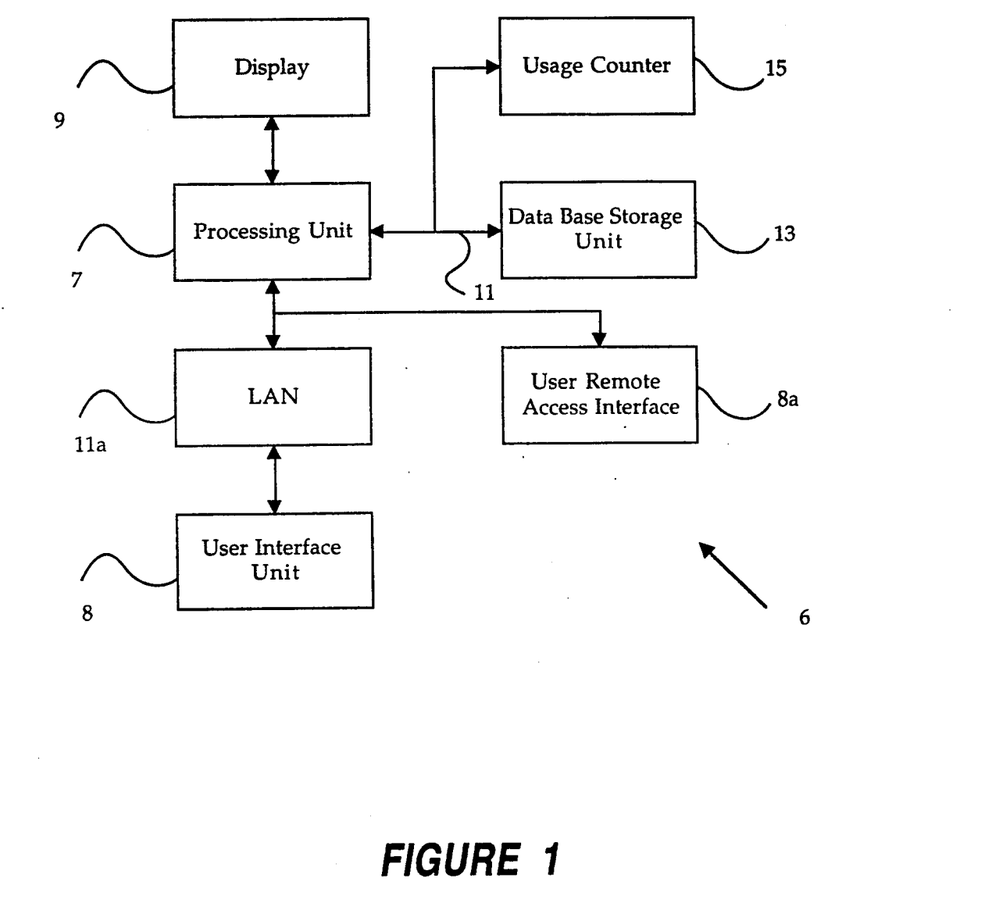
FIG. 1 is a block diagram of the computer-aided customer support system of the present invention.

The present invention relates to a heuristic system 6 of FIG. 1 which provides access to a database structure in an efficient manner in response to queries presented by a system user.

The present invention may be most advantageously used in customer support or "help desk environments" where the support process entails answering questions about an evolving, complex, mission critical software environment such as in a retail store that supports thousands of retail outlets using a large number of hardware and software systems. Usually, in such situations no one person can anticipate or know all aspects of the system being supported. The present invention provides a method for the support engineer to solve the question and provide a quick answer to the question supplied. If, however, an appropriate answer is not available on the system, the system of the present invention may be quickly and efficiently updated with an answer supplied by an expert in the hardware or software system being supported.

The system is also useful in supporting broader product development and support activities where the total product development activity involves engineering, quality assurance, customer support and/or marketing product management so as to provide a company wide support capability accessible to all support personnel.

Operation of system 6 is now described. In response to a query posed by the system user, the system facilitates the generation of a document that contains the query and a response or solution provided by an expert. Often additional users may benefit by access to the document and many times a few documents will clearly be much more useful to a large number of users than are other documents available in the system.

When documents are created they are initially inserted at the bottom of an index tree structure constructed of interconnected index buttons. Starting at the top of the index tree each index button of the index tree refines the query until eventually a list of relevant documents is presented to the user. The user may then select documents of interest for viewing. Often a single document may be of interest to a great many of users. One novel feature of the present invention enables the system to "learn" which documents are most useful to the user group and provide access to those documents at an index level higher up in the index tree.

The novel features believed characteristic of this invention are set forth in the appended claims. The invention itself, however, as well as other advantages, may be best understood by referring to the following detailed description read in conjunction with the accompanying drawings.

DETAILED DESCRIPTION OF THE INVENTION

The present invention relates to a team usage application program. As shown in FIG. 1, system 6 consists of an index organization structure adapted to accumulate documents which are combinations of questions and answers provided by experts. The documents are stored in an index for subsequent use by the users of the system 6 so that future questions may be quickly answered without necessitating access to the expert.

System 6 has a processing unit 7 connected to a user interface 8, a display 9 and a database storage device 10 coupled to processing unit 7 by bus 11. A user may access the present invention through interface unit 8 to activate a relational database program such as commercially available Sybase to set up a relational database on storage unit 13. Using the software programs of the present invention, discussed more fully below, the user may access information held in database storage unit 13 by requesting processing unit 7 to provide database storage information on display 9.

Figure 1A:
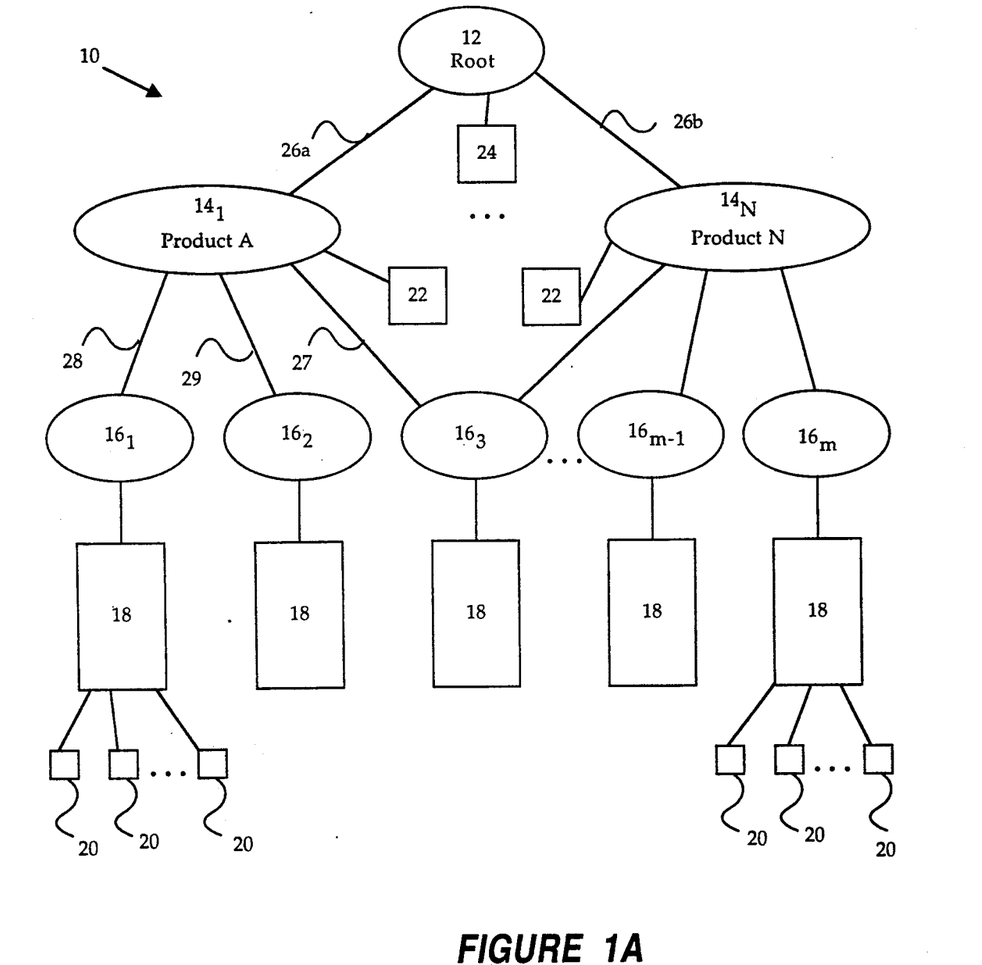
FIG. 1A is a diagram of one possible index tree structure that may be constructed to implement the present invention.

The software programs of the present invention provide access to the stored database information and generates a unique tree-like structure described in FIG. 1A.

The manner in which data is stored in storage unit 13 and the manner in which it is retrieved by processing unit 7 may be controlled in known manners by commercially available relational database software such as the above reference Sybase software.

Referring to FIG. 1A and Appendix F, an index tree 10 is an arrangement of all the indexes with the system 6. Index tree 10 provides the "road map" through which documents can be located and accessed and is user-configurable. In one embodiment index tree 10 comprises a root directory 12 from which depends up to eighteen product indexes $14_1$-$14_N$, referred to hereafter as a group as product indexes 14, at a first level. Additional index levels may be appended to the index tree 10 between product indexes 14 and a lowest level of product indexes $16_1$-$16_M$, referred to hereafter as a group as product indexes 16. In one preferred embodiment, the depth of index tree 10 is selected to have twenty product index levels extending from product indexes 14 to product indexes 16, inclusive.

Depending from the lowest level of product indexes 16, a document index 18 is appended. Document index 18 contains only lists of Documents, not other Indexes. Document index 18 may contain an unlimited number of entries where each entry corresponds to a document 20. Documents 20 are discussed in greater detail in conjunction with FIG. 2. While document index 18 may contain up to an infinite number of documents 20, each level of index tree 10 contains its own document list 22 and 24, associated with root directory 12 and product index 14, respectively. Since each level of index tree 10 may have several product indexes, there will be one document list 22 for each product index $14_i$, by way of example as is indicated by document list 22A and 22B. For convenience, document lists at a particular level will be referred to with a common reference numeral, it being understood that there are in fact a plurality of document lists for each index level.

Document list 22 and 24 contain a list of the most frequently accessed documents 20 at each particular index level as well as lower level indexes. In the preferred embodiment, document lists 22 and 24 contain up to twelve of the most frequently accessed documents 20 or indexes.

Figure 2:
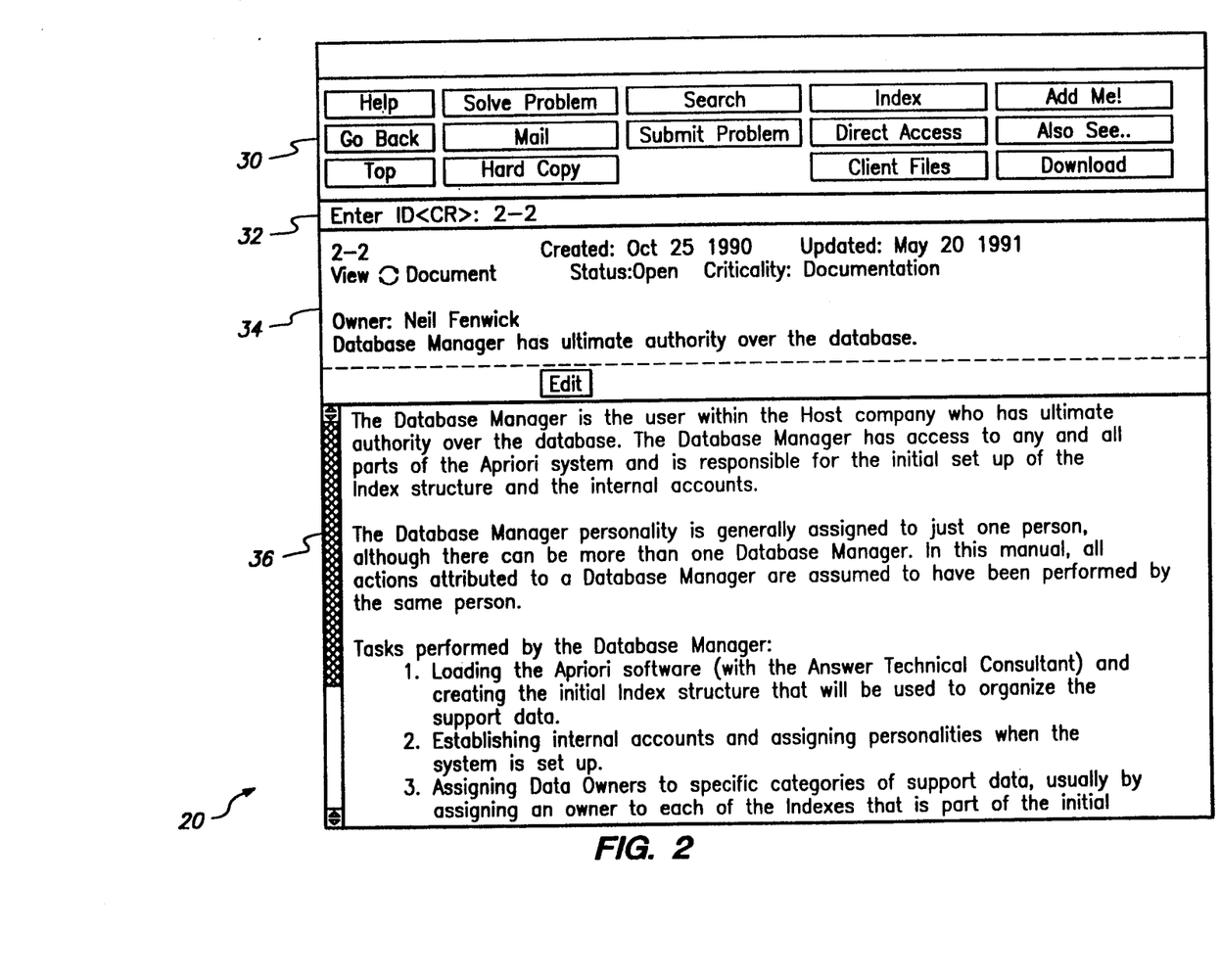
FIG. 2 is a first screen output depicting a typical document.

In FIG. 2, the graphical view of a document 20 is shown. A Document 20 is an element of the system 6 that stores a problem and a corresponding solution statement. Document 20 detail descriptions are free-form and may contain enhancement requests, application notes, pieces of documentation, memos, press releases, how-to or explanations of how to deal with the specific problem. Thus, document 20 is a compilation of a solution that has been successfully applied to a problem proposed by a user. Alternatively, document 20 may present a problem for which a solution is being developed.

When a user selects a particular document for viewing, document 20 when displayed on a terminal comprises a command menu 30 which presents the various commands available to the user. Commands presented by menu 30 may be selected from the keyboard, a mouse or possibly by voice recognition.

The display of document 20 further includes a security access key field 32, a history field 34 and an information field 36. Security key field 32 is provided so that a particular document can be accessed only by individuals whose security level allows access to the full document 20. History field 34 provides background information such as original requestor, the date the particular document 20 was created and a brief summary of the topic addressed by document 20. Information field 36 provides the solution to the proposed question or enhancement requests, applications notes, pieces of documentation, etc.

Referring again to FIG. 1A, the list of documents contained in document index 18 is originally displayed in the order in which each document 20 is appended to the document index 18. As new documents 20 are created, an entry is added to the appropriate list of document index 18. Each entry is a document summary item that when selected from the list causes the selected document 20 to be displayed for the user to view on display 9. Over time, as selected documents 20 are repetitively accessed, a useful access count associated with each document is incremented by the system 6.

At selected intervals, as determined by the system manager, the system 6 automatically performs a database list reorganization called Access Count Restructure. An Access Count Restructure is a process, scheduled or initiated by the system 6 manager, that reorganizes, updates and cleans the system's information base. The system 6 manager can set the exact time and frequency of the automatic reorganization as a system 6 parameter.

During the Access Count Restructure, the system 6 automatically performs several tasks, one of which is called the "bubble-up" computation. Bubble-up is a feature that ranks and presents the most frequently used Documents regarding a particular subject area. The bubble-up computation determines which of documents 20 have been most useful to the users of the system 6 over a selected time interval. As a result of the bubble-up computation, the entries of document lists 18 are arranged such that the most useful of documents 20 are listed first and unused documents 20 are listed near the end of the document list 18. Thus, the most useful documents 20 bubble-up to the top of document list 18 and documents 20 which have not been recently accessed nor found to be useful drift downward. The entries of document list 18 thus rank documents 20 that are the most useful to the users.

Document lists 22 and 24 (FIG. 1A) are also updated during the bubble-up computation. Specifically, the entry for a popular document 20 listed in the document list 18 appended to product index $16_1$ will, with a sufficiently high useful access count, be included in document list 22A. In the preferred embodiment, document list 22A will include up to twelve of the most useful documents 20 appended to product indexes $16_1$-$16_3$ (by way of example). Similarly, document entries in documents 22A and 22B constantly move towards the top of the index structure as determined by the useful access count.

Figure 3:
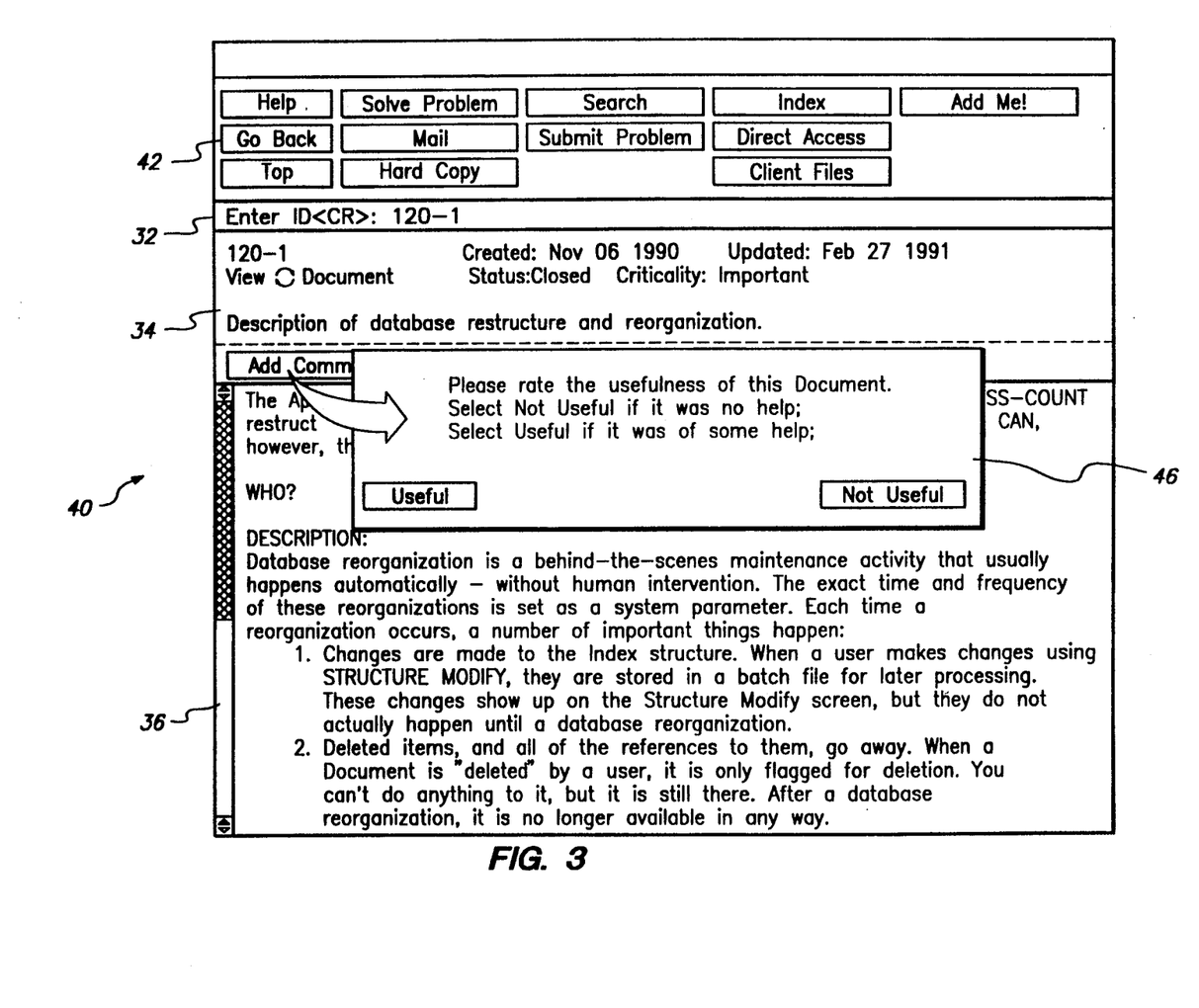
FIG. 3 is a second screen output depicting the voting function after the document displayed in FIG. 2 has been viewed by the user.

The useful access count is accumulated in response to user voting. After the user has accessed a document 20, and immediately before the user leaves the viewing of the document, a useful alert screen 40 is presented to the user. Screen 40 may be best understood by reference to FIG. 3. As with the graphical view of document 20, screen 40 comprises a command menu 42. However, since different commands may be appropriate at this point, command menu 42 differs from command menu 30. Screen 40 includes security key field 32, a history field 34 and an information field 36 that function in the same manner as discussed above. Screen 40 further includes a voting field 46 that prompts the user to advise the system 6 whether the document 20 displayed immediately prior to the display of screen 40 was useful to the user.

When the user locates and displays a document, he sees that it usually contains an extended description of the problem and a discussion of the solution. Document length varies according to the complexity of the problem and the steps required to solve the problem. Some documents may not yet contain a solution but do contain a statement about the problem and what is known about it so far, such as a workaround.

The system provides several other ways to locate documents, one of which is by the Logical Filing method. The system documents are filed logically by subject, and the filing system, as represented by the index buttons on the Solve Problem screens, is specific to each installation. The user finds a specific document by selecting his way through index buttons, related to the problem. By selecting the index button that is most closely related to the problem the person asking the question has described, the user can avoid irrelevant documents and confine his search to documents most likely to contain a solution.

Figure 2A:
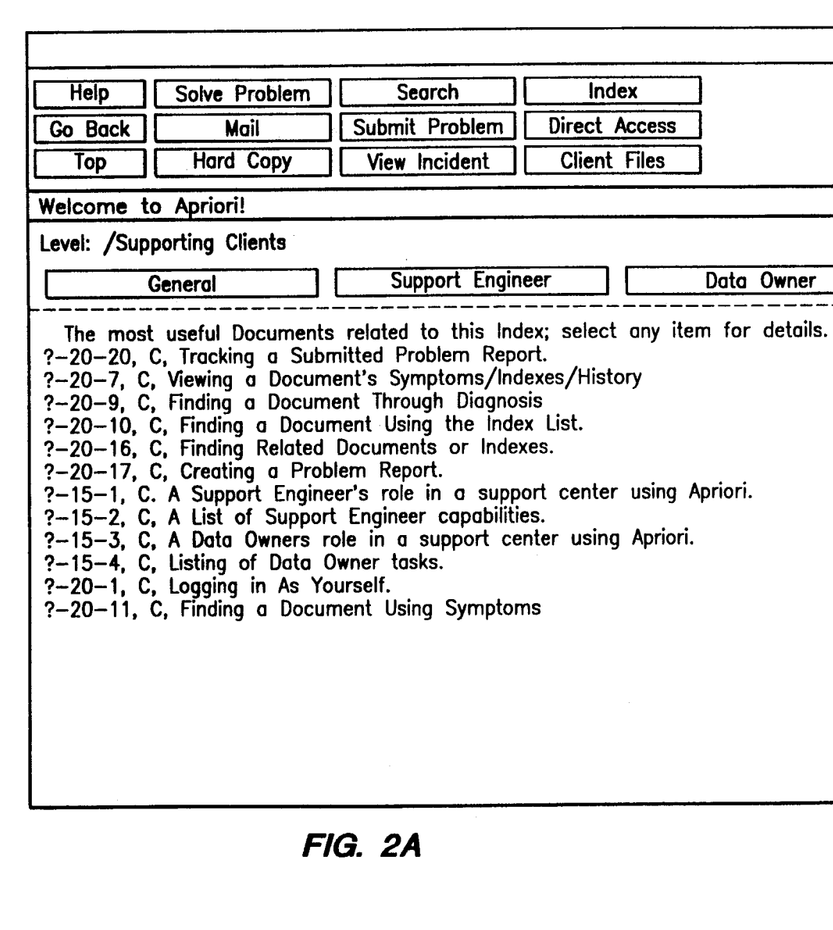
FIG. 2A is a second screen output depicting a typical document.

Referring now to the software listings of Appendix A and B, operation of the system 6 is provided. Display of document lists 18, 22 and 24 is accomplished by the computer code in Appendices A and B. In response to a solved problem screen 40 selection, a Hit Index Button routine is called. The Hit Index Button routine preforms housekeeping setup and then calls a Solved Problem Setup routine which looks at the selected index. If it is a document index, it calls the routine DocIndex. If it is an index tree 10, it calls the routine ScanIndex. The ScanIndex routine builds the document list for index tree 10. The DocIndex routine builds the document list for the document index. The ScanIndex routine will use the DbIntRSDescFreqAcc routine to get all frequently accessed documents associated with the index. The DocIndex routine will use the DbIntRSDescSubDoc to get all the documents in a document index in ranked order by usefulness. The addition of the "?-" (see FIG. 2A) into each document summary item is a user interface signal that the item may be displayed in an expanded form to see the complete detail on the document.

Referring now to Appendix C, a DirectAccessClose routine is entered after a user looks at a document and then attempts to go to some other screen in the system 6. In this code the user is prompted with a system 6 alert message asking whether or not the viewed document was found to be useful or not useful. The result of the vote is recorded temporarily and a call is made to the print index path routine that is further shown in Appendix D.

Appendix D has three key routines: the AddIndexToPath, the PrintIndexPath and the AccessInfoToServer routine. The AddIndexToPath is a routine that is used by the solved problem portion of system 6 referred to in Appendix A. As the solved problem is initiated, the routine makes calls to AddIndexToPath so that it can remember the path it takes to a particular document list in system 6. After a user votes on the usefulness or non-usefulness of a document, as shown in Appendix C, the PrintIndexPath routine is entered to collect the path information that was accumulated by AddIndexToPath and formulate the information into a form suitable for writing to a normal disc file. This disc file write is accomplished by the routine AccessInfoToServer routine.

The code that is called automatically by system 6 or on demand by the system 6 manager to accomplish the database access restructure, is shown in Appendix E. The main routine, called RestructMain, does database reconstruction based on document access counts, reads the access file from the primary disc (named .acess) and updates the information read by the DocIndex and ScanIndex routines shown in Appendices A and B.

Figure 4:
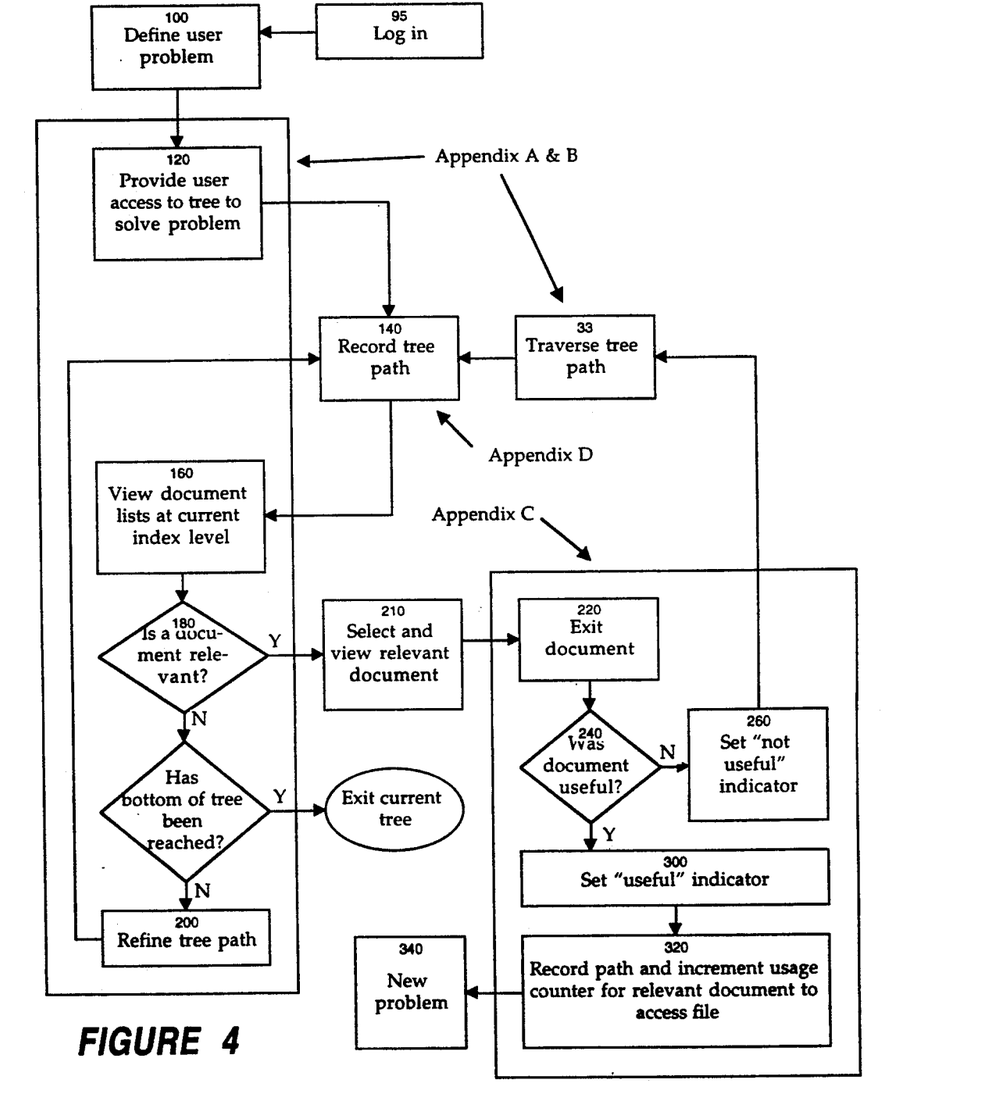
FIG. 4 is a flow diagram depicting one possible sequence when the system 6 of the present invention is accessed by the user.

Operation of system 6 of the present invention is disclosed in FIG. 4. Initially, the user must log into computer system 6 on which system 6 software resides as indicated at 95. The user must then define a problem as indicated at 100. When a problem has been defined, system 6 provides the user access to the index tree 10 in order to solve the problem as is indicated at 120. As described more fully in Appendices A and B, the user views the document list 22 at the root or top index button. If the document is available at document list 22, the user may immediately access the listed document for a solution to the problem. However, the solution to the problem may not be available at the root 12 level. Accordingly, the user must select a path such as path 26a or 26b in FIG. 1A. The system 6 records the selected tree path and provides a second list of documents available at the current index tree 10 location. If a document in the current list appears relevant, the user may select and view the relevant document. If, however, no documents appear relevant, the user may either retreat back to the prior index button or traverse a new path such as path 28, 29 or 27, or abandon the search completely for some other activity.

Traversing index paths may continue until a relevant document is found or the user has reached the bottom of the tree. As before, if a relevant document is found the user selects and views the relevant document as is indicated at 210.

After viewing the document the user must exit the document as shown at 220, at which time system 6 requires the user to determine whether the document was "useful" or "not useful" as indicated at 240. If the document is designated as "not useful," the system 6 sets a temporary "not useful" indicator and allows the user to refine the tree path by selecting adjacent index buttons as indicated at 260 and 280. The user is then directed back through the tree to the appropriate index button so that the document list at the current index level may be viewed as indicated at 160. The process above is repeated until a relevant document is found or the bottom of the tree has been reached at 200.

If, however, the user determines that the document was useful in solving the problem, system 6 sets a temporary "useful" indicator at 300. At this time system 6 records the successful path and increments a "usage" counter 15 for the relevant document. The usage counter is located in an "access" file which in the preferred embodiment is a flat file in the Unix or other resident operating environment. Thus it is a simple matter to store path and usage information on readily accessible disc or tape drive storage. Updating the access file occurs at 320 in FIG. 4.

Since the problem proposed by the user at step 120 has been successfully solved at step 320, the user may define a new problem at step 100 or exit the system 6.

Steps 220 through 320 are set forth in greater detail in Appendix C. Step 140 which records the actual tree path chosen in order to solve a problem as indicated at step 140 is described in greater detail in Appendix D.

To solve a specific problem using system 6 of the present invention, a user provides a description of a problem to be solved. The first level 14 of indexes in index tree 10 is displayed along with a list of the most useful documents contained in document list 22 and 24.

The user may review the document list to see if any description addresses the current problem. The user may select and display the contents of any document that appears to relate to the present problem. If no document is found that addresses the current problem, the search is further refined and another path of the tree structure is selected again providing a deeper level of index tree 10 along with a further listing of the most useful documents.

A user continues to review the list of documents at each level to see if any document addresses the current problem. If the user determines that a document is relevant, it is selected and the entire contents of the document is displayed for viewing by the user. If after repeated problem definition and document list viewing, it is determined that no document contains a relevant solution or that all relevant paths have been searched, a query may be formulated and provided to system 6 for solution by an expert in the subject matter of the problem.

If, however, a document is located containing the solution to the current problem, system 6 keeps track of such occurrence. In order to keep track of whether a document was useful in solving the problem, system 6 queries the user upon exiting the viewing of the document. At this time, the user must determine whether the document was useful or not useful. If the document was useful, system 6 uses this information to determine the order in which documents are displayed along a particular tree path 10 in the document list.

Figure 5:
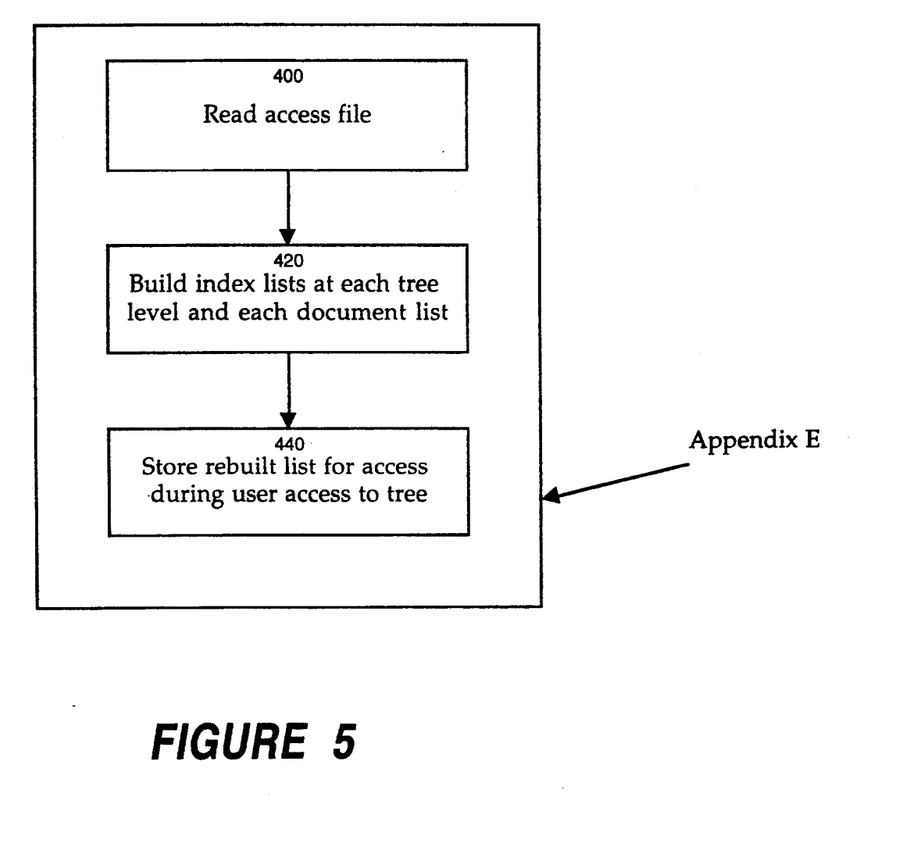
FIG. 5 is a flow diagram depicting the restructuring sequence implementing the present invention.

Referring now to FIG. 5, documents which are often found to be useful are bubbled-up to higher index tree 10 levels so as to be more readily accessible by the user. In order to bubble-up a particularly useful document, the access file described in conjunction with step 320 of FIG. 4 is read by the Access Restructure Program automatically, or on demand by the system manager at step 400 using program information provided in Appendix E. The document list at each index tree 10 level and at each document list level of the document index (FIG. 1A) are rebuilt so that those documents having a high usage count are bubbled-up to a higher index tree 10 list level as indicated at step 420. Subsequently, the rebuilt document lists are stored in the database for later access when a user needs to solve a problem as is indicated at step 440. During the rebuilding of each list the bubble-up routine identifies those documents which have been more frequently accessed over a selected time period.

Initially all documents start at the bottom of a document list in the document index. In the document list at each document index, the presentation of documents is in the order added. However over time and with usage, the number of times each document is accessed and found useful is recorded. It is desirable to bubble-up individual document to a higher level so that subsequent users have ready access to those most useful documents without following a convoluted tree path to obtain the documents. Thus, as a document's usefulness increases to more users, it will be available at higher levels of the index tree.

Of course, once the users have, over time, learned the solution to a problem, frequency of access to that document 20 will tend to decrease. Thus, popular documents after bubbling-up upwards through index tree 10 will also tend to bubble downwards.

The software provided in Appendix E can, under user control take into account usage on a daily basis, the daily number of document accesses, and the rolling average of document accesses over a selected time period.

It will be understood by one skilled in the art that the solution to a problem resident along a specific path of tree index 10 may be an equally valid solution to a problem that would typically be located along a different path. Thus, it is often advantageous for the system 6 manager or document experts to copy highly useful documents to one or more index paths. In order to copy such useful documents, a particular document 20 may be copied from one document list at a particular document index location and then copied to or located at a second and/or additional document lists at other locations of index tree 10. For example, from document list 18 appended to product index $16_1$, a document listing may be copied to document list 18 appended to product index $16_M$. Clearly, the document listing could also be copied to document listings appended to product indexes 12 or 14.

However, simply moving document listings in the system 6 can cause erroneous readings during the system 6 access update (see step 420 of FIG. 5). Such erroneous readings would occur because even though a document 20 was useful along a particular index path, that same document 20 may not be as useful when copied to another index path. Thus, the copied document listing in the second or third document list may be artificially designated as a useful document when in fact such usefulness has not been proven along this path.

In order to avoid giving an artificially high bubble-up index to a copied document, the counter, that keeps track of the number of useful accesses for each document along an index path, must be rest or initialized. The reason it is necessary to initialize the counter for the copied document listing is to prevent the erroneous appearance of usefulness at its new index location. When a document 20 is first developed, the counter is set to 1 to indicate the solution for the original user query. As subsequent users access the document 20 over time the useful count increases accordingly. However, when the system 6 manager or document expert selects a document for multiple listings in index tree 10, that document has not been found useful for any user query. By initializing the counter to zero, the system 6 manager does not skew the count of the copied document 20 relative to the documents 20 already contained in the document list at the document index button to which the product listing was copied.

Referring again to FIG. 1 system 6 optionally further includes a local area network (LAN) interfacing processing unit 7 with user interface unit 8. One skilled in the art should understand that with the addition of LAN 11a a plurality of users maybe interfaced to processing unit 7 so as to timeshare the processing capabilities provided by processing unit 7. Further, system 6 may optionally include a remote user access interface device 8A. Remote interface access device 8A may provide remote access by a user and includes equipment such as provided with high speed modems. User interface units 8 may have multiple user capability.

Although a preferred embodiment of the present invention has been described in detail, it is understood that the present invention is not limited to the embodiments disclosed, but is capable of numerous modifications and substitutions without departing from the spirit of the invention.

What is claimed is:

1. A computer-aided customer support system for storing and rapidly retrieving response documents in response to customer inquiries, comprising:
    a processor for executing programmed instructions, accessing stored documents, and generating an index structure containing records for facilitating document access;
    a user interface connected to the processor for accepting a problem definition from a user in query form, and for communicating information and instructions between the user and the processor; and
    data base storage means connected to the processor for storing program instructions, documents and usage counters, each usage counter being associated with a document for incrementing responsive to a user indicating that the response document was useful in solving the problem for which the response document was accessed to keep track of the relative usefulness of the particular response document for similar problems;
    interrogation means, coupled to he data base storage means, for interrogating the user and accepting a signal from the user indicating a relative usefulness measurement of the response document to the user; and
    repositioning means, coupled to the data base storage means, for combining relative usefulness measurements and repositioning the response document within the index structure to list more useful documents at higher levels in the index structure than less useful documents.

2. A computer-aided customer support system for storing and rapidly retrieving response documents in response to customer inquiries, comprising:
    a processor for executing programmed instructions, accessing stored documents, and generating an index structure containing records for facilitating document access;
    a user interface connected to the processor for accepting a problem definition from a user in query form, and for communicating information and instructions between the user and the processor;
    data base storage means connected to the processor for storing program instructions, documents, and an index structure, the index structure comprising:
        a root index; and
        a plurality of lower level indexes appended to the root index and a plurality of document indexes, each document index containing:
            a list of related documents for facilitating access to documents in response to inquiries, wherein the documents contain responses to past and anticipated customer inquiries; and
            a usage counter associated with each document containing a measurement of the usefulness of the associated document, the measurement of the usefulness being generated based on a combination of signals from a plurality of users;
    means connected to the data base storage means for repeatedly accepting successive structure path selections from the user;
    means connected to the data base storage means, responsive to the response document existing at the level pointed to by the path, for retrieving the response document;
    interrogation means coupled to the data base storage means, for interrogating the user and accepting a signal from the user indicating a relative usefulness measurement of the response document to the user; and
    repositioning means, coupled to the data base storage means, for combining relative usefulness measurements and repositioning the response document within the index structure to list more useful documents at higher levels in the index structure than less useful documents.

3. The computer-aided customer support system of claim 2, wherein the root index and each lower level index level further contain:
    a list of the appended lower level indexes; and
    an associated list of documents.

4. A computer-implemented method for rapidly retrieving response documents from a computer-aided customer support system having an index structure data base having a plurality of levels, the method comprising the computer-implemented steps of:
    accepting a problem definition from a user in query form suitable for document retrieval and solution;
    accessing the index structure;
    accepting a structure path selection from the user based on index data available at each level;
    responsive to a response document not existing at the level pointed to by the structure path, performing the repeated step of accepting successive structure path selections from the user based on index data available at the level pointed to by the most-recently selected structure path;
    responsive to the response document existing at the level pointed to by the path, performing the steps of:
        retrieving the response document;
        interrogating the user as to the usefulness of the response document retrieved;
        accepting a signal from the user indicating a relative usefulness measurement of the response document to the user;
        combining relative usefulness measurements from a plurality of users of each retrieved document; and
        responsive to the results of the combining step, repositioning the response document within the index structure to list more useful documents at higher levels in the index structure than less useful documents.

* * * * *